(12) United States Patent
Ciccone et al.

(10) Patent No.: US 7,291,000 B2
(45) Date of Patent: Nov. 6, 2007

(54) INTERCHANGEABLE MOLD INSERT SYSTEM

(75) Inventors: Vince Ciccone, Ontario (CA); Petrica Maran, Ontario (CA)

(73) Assignee: Injectnotech, Inc., Mississauga, Ontario (CA)

( * ) Notice: Subject to any disclaimer, the term of this patent is extended or adjusted under 35 U.S.C. 154(b) by 48 days.

(21) Appl. No.: 10/531,238

(22) PCT Filed: Oct. 17, 2003

(86) PCT No.: PCT/CA03/01582

§ 371 (c)(1),
(2), (4) Date: Apr. 14, 2005

(87) PCT Pub. No.: WO2004/035290

PCT Pub. Date: Apr. 29, 2004

(65) Prior Publication Data

US 2005/0266111 A1    Dec. 1, 2005

(30) Foreign Application Priority Data

Oct. 18, 2002   (CA) .................................. 2408813

(51) Int. Cl.
*B29C 33/12* (2006.01)
*B29C 33/30* (2006.01)
(52) U.S. Cl. .................. 425/192 R; 249/102; 425/195
(58) Field of Classification Search ............ 425/192 R, 425/195, 542; 249/102, 103, 104
See application file for complete search history.

(56) References Cited

U.S. PATENT DOCUMENTS 2,291,580 A * 7/1942 Poglein ....................... 249/102

4,684,101 A    8/1987 Wagner et al.

(Continued)

FOREIGN PATENT DOCUMENTS

EP          0404713        12/1990

(Continued)

OTHER PUBLICATIONS

"Injection Molding Handbook"; Rosato D V; pp. 282-285, figures 4-77, no date.

(Continued)

*Primary Examiner*—Robert B. Davis
(74) *Attorney, Agent, or Firm*—Steven, Davis, Miller & Mosher, LLP (57) ABSTRACT

An insert system for an injection mold apparatus is provided. The mold has a mold cavity plate (14) and a mold core plate (12) each secured to mold bases (16, 18), relatively movable between open and closed positions, each having opposing faces, the faces meeting to define a mold cavity between the two faces. At least one of the mold plate faces defines a facial pocket (40) therein for insertion of a mold insert (30). The mold insert is secured to an insert rod (36). The mold plate having the facial pocket (40) defines a passageway (46) extending from the facial pocket through the plate (12) and mold base (16). The insert rod is insertable into the passageway to a position where the insert sits within said facial pocket at a prelock position, where said insert is only partially inserted into said facial pocket. Preferably, the insert is biased in this prelock position. Locking means (64, 66, 38, 70, 74, 76, 101, 63A, 63B) is operably connected to the insert rod (36), operable from the periphery of said mold base, to releasably lock the insert rod within said passage and, thus, the insert from said prelock position to a fully inserted position where the insert sits flush with the mold plate face.

13 Claims, 10 Drawing Sheets

U.S. PATENT DOCUMENTS 4,867,668 A    9/1989  Miyairi
5,895,621 A    4/1999  Tajiri et al.
6,120,279 A *  9/2000  Vovan ..................... 425/190

FOREIGN PATENT DOCUMENTS

| | | |
|---|---|---|
| JP | 1295813 | 11/1989 |
| JP | 4007114 | 1/1992 |
| JP | 07009456 | 5/1995 |
| JP | 11000935 | 1/1999 |
| JP | 11010650 | 1/1999 |

OTHER PUBLICATIONS

"Volltauschbares Werkzeug-Wechselsystem"; Plastverabeiter, Zechner Und Huethig, vol. 45, Nr. 5, pp. 42-43, figure 2, Jan. 1994.

* cited by examiner

INTERCHANGEABLE MOLD INSERT SYSTEM

This application is a §371 U.S. National Stage Application of International Application No. PCT/CA03/01582, filed on Oct. 17, 2003, claiming the priority of Canadian Application No. 2,408,813, filed Oct. 18, 2002, the entire disclosures of which are incorporated herein by reference in their entireties.

BACKGROUND OF THE INVENTION

The present invention relates to the field of injection molds, and more particularly, to an apparatus for removing and inserting mold inserts from injection molds.

Figure 1:
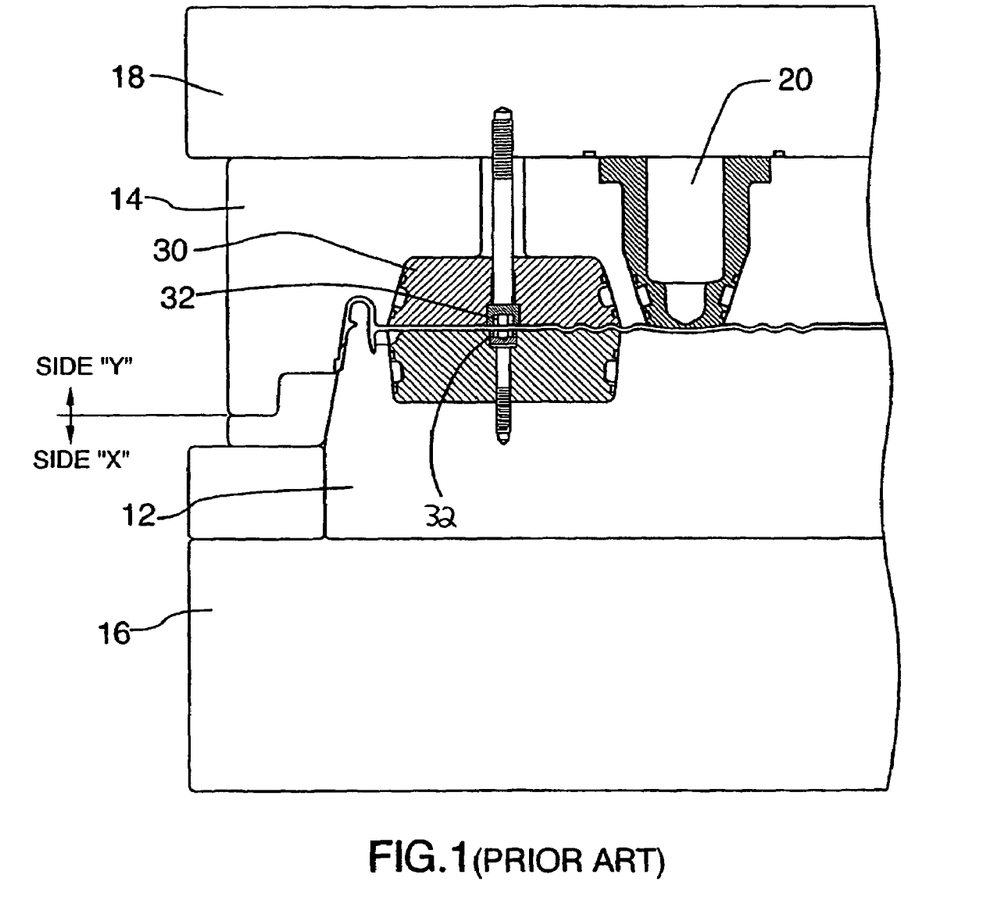
FIG. 1 is a partial section view of an injection mold apparatus showing mold inserts inserted in mold plates in a manner known in the prior art.
Figure 2:
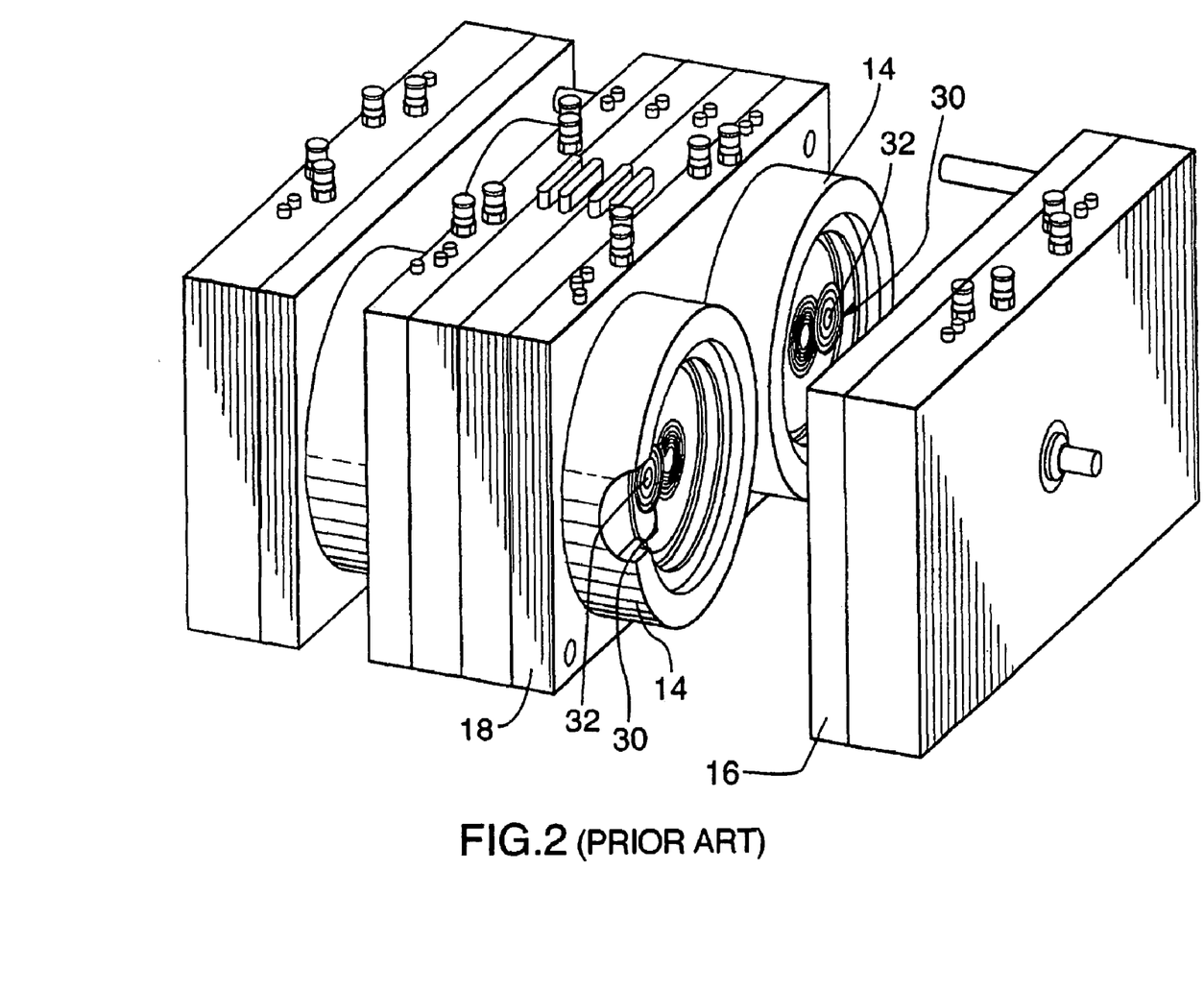
FIG. 2 is a perspective view of an injection mold apparatus showing mold inserts secured to mold plates in a manner known in the prior art.
Figure 3:
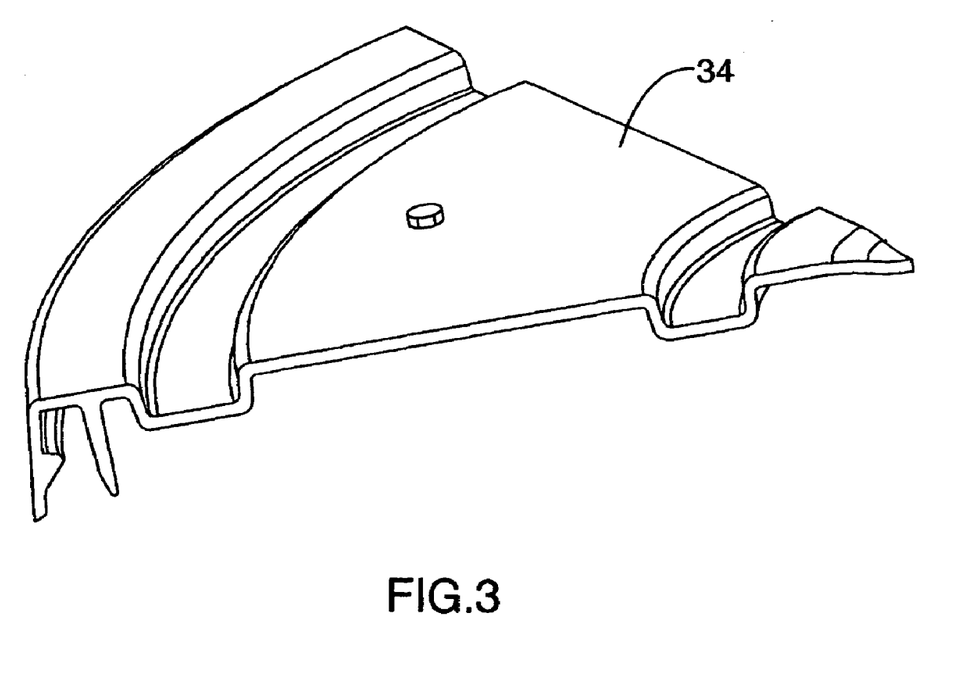
FIG. 3 is a perspective view of a section of lid produced from a known mold apparatus of the prior art, evidencing the screw boss of the screw used to secured the insert to the mold plate.

A conventional injection mold includes a core plate and a mating cavity plate into which the core assembly fits. The cavity and core are movable relative to each other between open and closed positions to define the molding chamber between them in the closed position. Typically, one half of the mold is affixed to a stationary platen (often referred to as the A side of the mold) while the other half (often referred to as the B side) is affixed to a movable platen. Container lids are commonly produced from injection molding process. Often, interchangeable mold inserts are used in injection molds for container lids. An example of such an insert is a closure insert or an engraving insert for container lids The purpose of closure inserts is to mold opening configurations such as crimp-on, threaded and push in styles into the lid, which thereby will allow various closure styles to be utilized with the lid. Engraving inserts allow a custom engraving to be evident on the lid. Typically, such inserts are secured on the mold cavity assembly from the face of the mold cavity by means of a mounting screw (as shown in FIG. 1 and FIG. 2). While it is possible to mount the insert from the rear of the cavity or core, the time and effort necessary for rear mounting of the insert by means of a mounting screw makes it practically infeasible to do so. In order to mount the insert by means of a screw from the rear, the core or cavity plate must be removed from the plate each time. Because inserts, such as closure inserts, may be changed several times a day during mold processing of lids, it is more common to mount the insert from the front of the mold, to allow easy access and speed of changing. With a blank insert, as with a closure insert which forms an opening with a membrane, the central panel of the lid will evidence the boss used to secure the blank in place (as seen in FIG. 3). Known means of securing inserts within injection mold apparatus from the rear do not allow for quick and relatively easy insertion thereof without the removal of the mold plates.

SUMMARY OF THE INVENTION

It is an object of the present invention to overcome, inter alia, the shortcomings of the prior art described above by providing an improved interchangeable insert system for molds. This and other objects are addressed by the present invention.

According to one aspect of the invention, there is provided a mold insert system for an injection mold apparatus comprising a mold cavity plate and a mold core plate each secured to mold bases, relatively movable between open and closed positions, each having opposing faces, said faces meeting to define a mold cavity between the two faces, said cavity defining the shape of a molded article, at least one of said faces defining a facial pocket therein for insertion of a mold insert, said facial pocket defining an insert passageway extending from the facial pocket through the plate and base, said mold insert secured to an insert rod, said insert rod insertable into said passageway to a prelock position, whereat said insert is partially inserted into said facial pocket; locking means operable from the periphery of the mold base connected to said insert rod to move said insert and rod from said prelock position to a fully inserted position whereat said insert is fully inserted within said pocket.

Other advantages, features and characteristics of the present invention, as well as methods of operation and functions of the related elements of the structure, and the combination of parts and economies of manufacture, will become more apparent upon consideration of the following detailed description and the appended claims with reference to the accompanying drawings, the latter of which is briefly described hereinbelow.

DESCRIPTION OF THE EXAMPLE EMBODIMENTS

In the description below, like reference numerals are used to indicate components which are similar in the various embodiments of the present invention. As shown in the FIGS. 1 to 7C, a mold apparatus comprises mold plates 12, 14 secured to mold bases 16, 18 respectively. Core plate 12 is secured to core mold base 16. The cavity plate 14 is secured to cavity mold base 18, designed for mating with the core plate 12 such that when the plates are brought together, molten plastic may be injected between the plates, for producing molded plastic products. Such molten plastic is injected between the plate faces in a known manner, typically through a sprue 20 extending through the cavity plate to a nozzle (not shown) leading through the plate faces. Shown in FIGS. 1 and 2 is a mold insert system of the prior art, showing mold inserts 30 secured to mold plates 12, 14, which in turn are secured upon mold bases 16, 18. As shown in FIGS. 1 and 2, the cavity side (side y) of the mold is shown with mold insert 30 secured to the mold plate by means of a screw 32 inserted from the front of the mold plate 14. As can been seen in FIG. 2 and as explicitly shown in FIG. 3, the mounting of the screw 32 from the front will show evidence of the screw boss on a molded article 34 when the insert is blank or when a membrane is present over the insert.

Figure 4:
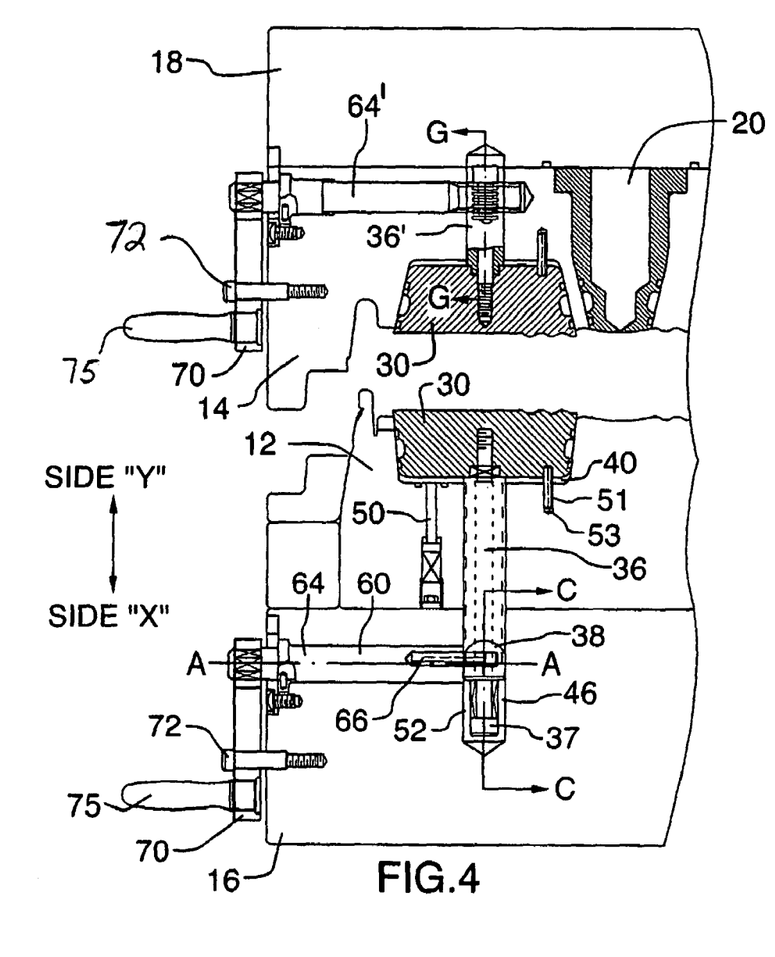
FIG. 4 is a partial section view of a preferred embodiment of the insert system of the invention, shown on the core side (x side) showing a mold insert inserted in a facial pocket of a mold plate in accordance with the invention in an insert pre-lock position and also showing an alternate embodiment of the insert system on the cavity side (y side) of an injection mold apparatus.
Figure 4A:
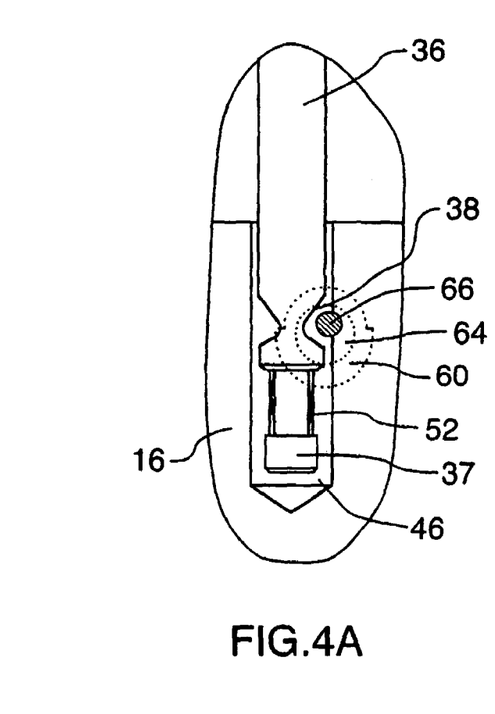
FIG. 4A is a partial section view of the embodiment of FIG. 4 taken along line C-C.

Shown in FIGS. 4 to 7C is an embodiment of the invention which utilizes a cam system to clamp the insert 30 in place within a facial pocket 40 on the mold plate. As shown in FIG. 4 (on the X side) a mold insert 30 is secured to an elongate insert rod 36 having a transverse slot 38 extending thereacross. The insert 30 is secured to the insert rod 36 preferably by means of a socket head shoulder bolt screw fastener 37 or any other suitable means. As is illustrated in FIGS. 4, 5 and 7B and 7C, the mold insert 30 is positioned into a facial pocket 40 on the mold plate 12 shaped to accept the mold insert 30. The mold insert 30 includes a guide pin 51 on its rear face which is shaped to be inserted into a mating opening 53 in the pocket 40 which assists in proper radial positioning of the insert 30 within the pocket 40. Furthermore, radial locating slots 55 may be present on the insert and the mold face adjacent the pocket 40. The radial slots 55 on the mold face and insert are in alignment when the guide pins are properly inserted into their mating openings. The insert rod 36 may be inserted into an elongate insert passageway 46 extending through the mold plate 12 and into the mold base 16, shaped to accept the insert rod 36. FIG. 7A shows the facial pocket 40 shaped to accept the insert 30, which also shows the elongate insert passageway 46. Present within the facial pocket 40 is a spring loaded bumper 50 which acts against the insert 30 to bias the insert 30 in place within the insert pocket 40 slightly offset from being completely inserted in the pocket in the prelock (or offset) position as shown in FIG. 4 (X-side) and FIG. 7C. Also provided is a heavy tension spring 52 positioned adjacent the lead end 54 of the insert rod. The heavy tension spring 52 is attached between the body of the insert-rod 36 and the head of the shoulder bolt screw 37. The body of the insert rod 36 is movable axially relative to screw 37. The spring 52 biases the screw head relative to the rod 36, however the spring 52 will allow some compression between the body of the rod 36 and the head of the screw 52. When the rod 36 is completely inserted into the passageway 46, the insert is in a prelock (or offset position) shown in FIGS. 4 (X-side) and 7C, namely with the insert being slightly offset from full insertion into the cavity, thereby allowing manual removal of the insert from the facial pocket. The spring 52 and bumper 50 biases the insert 30 in the prelock position.

Figure 5:
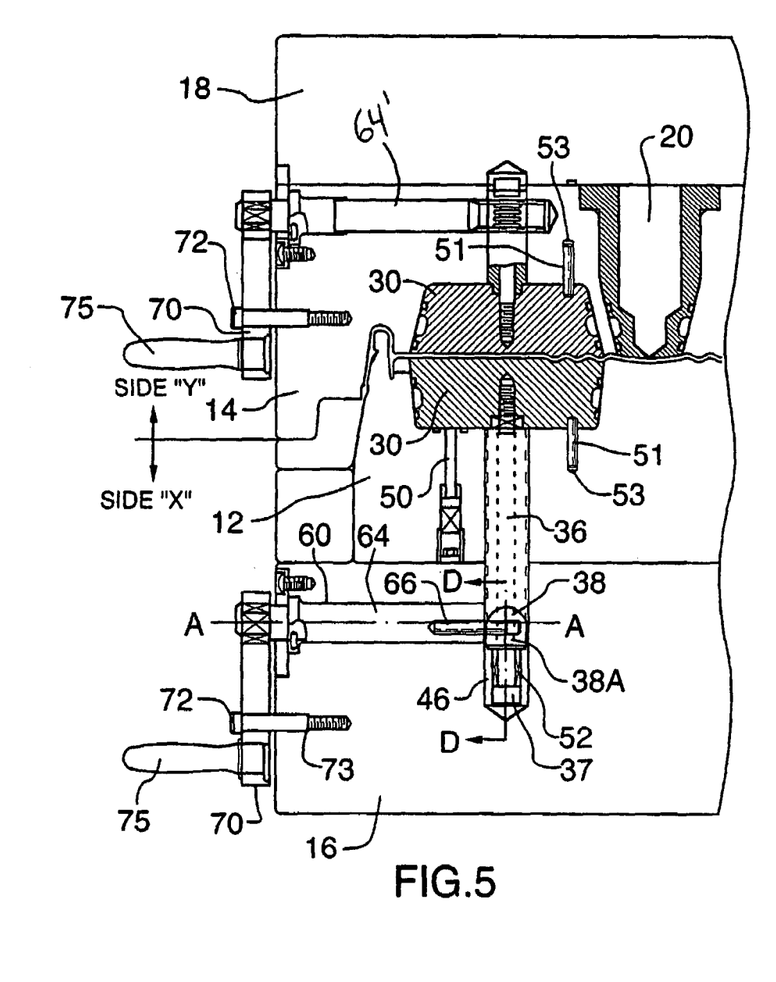
FIG. 5 is a partial section view of the embodiments of the insert system corresponding to FIG. 4, showing the insert in a fully inserted position within the facial pockets of the plates.
Figure 5A:
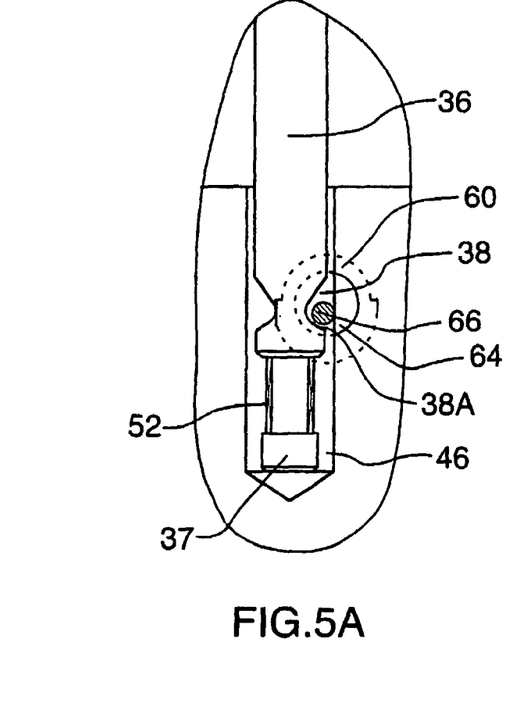
FIG. 5A is a partial section view of the embodiment of FIG. 5 taken along line D-D.
Figure 6:
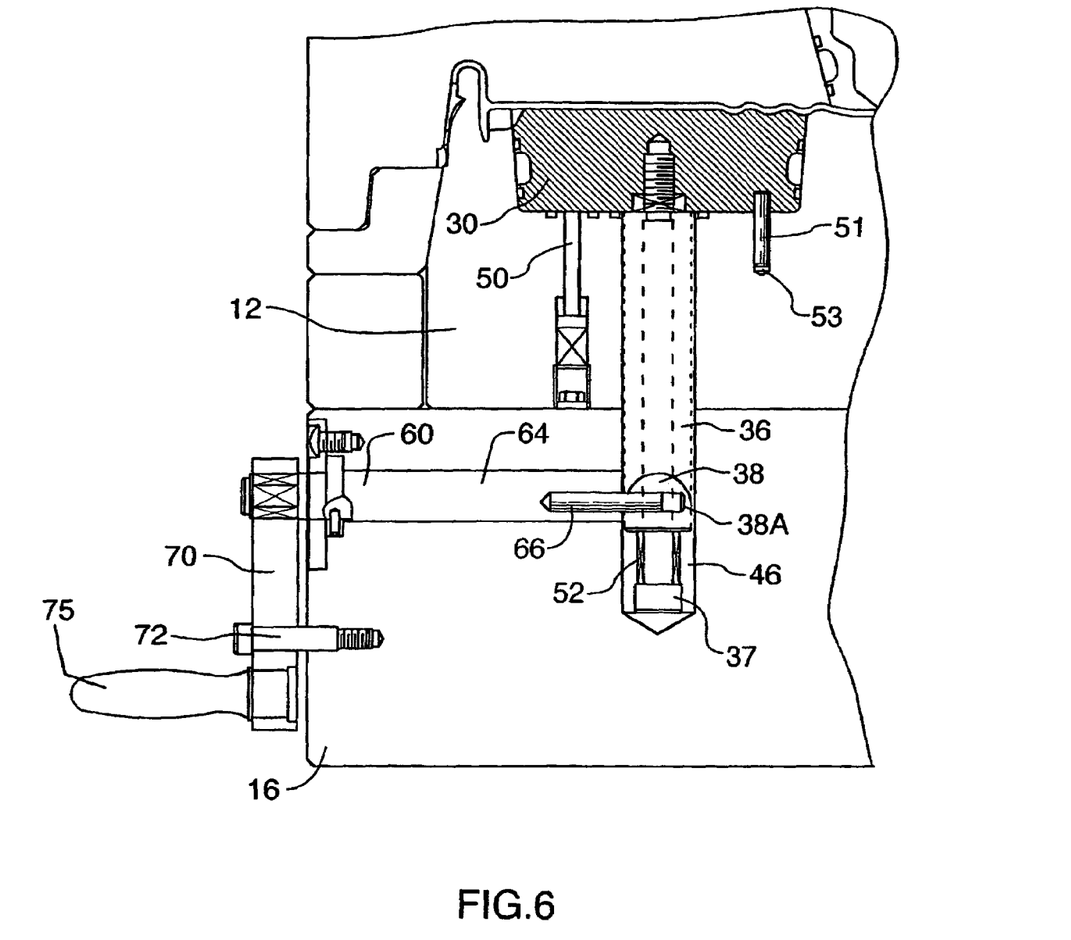
FIG. 6 is a partial section view of the preferred embodiment of the invention, illustrating the insert in a fully inserted position.
Figure 7A:
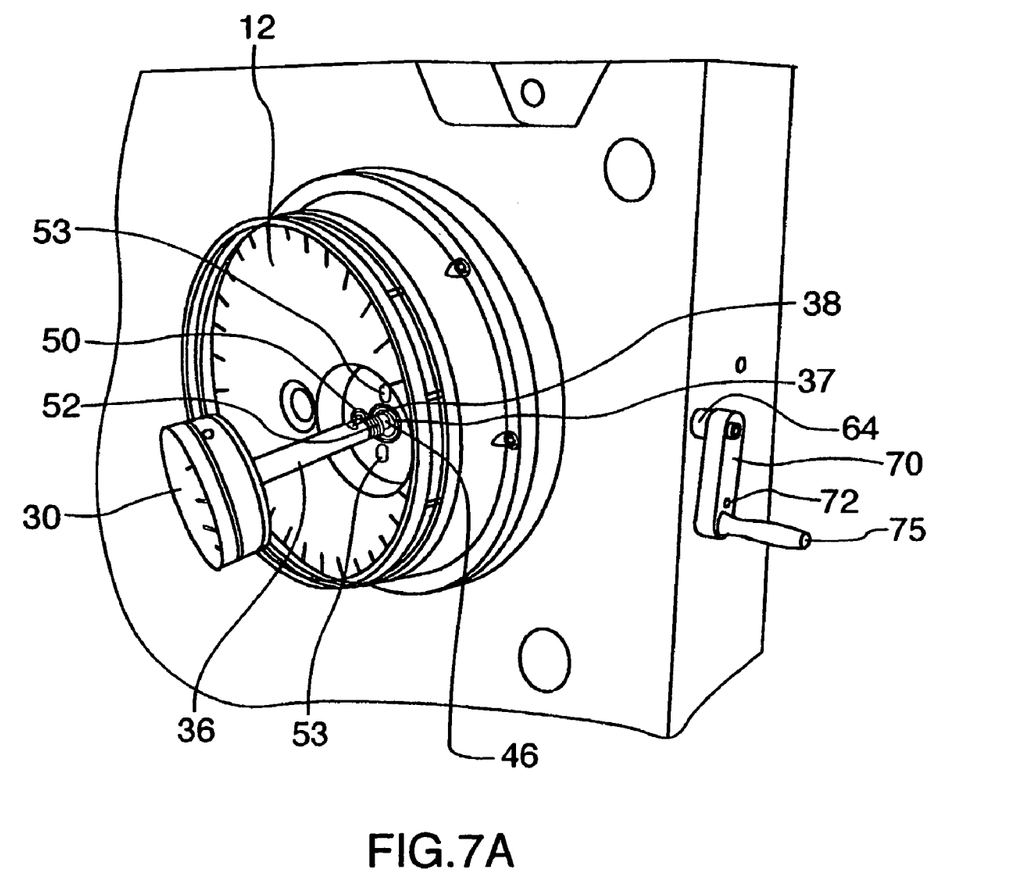
FIG. 7A is a perspective view of the insert rod and insert being positioned into the facial pocket of the mold plate.
Figure 7B:
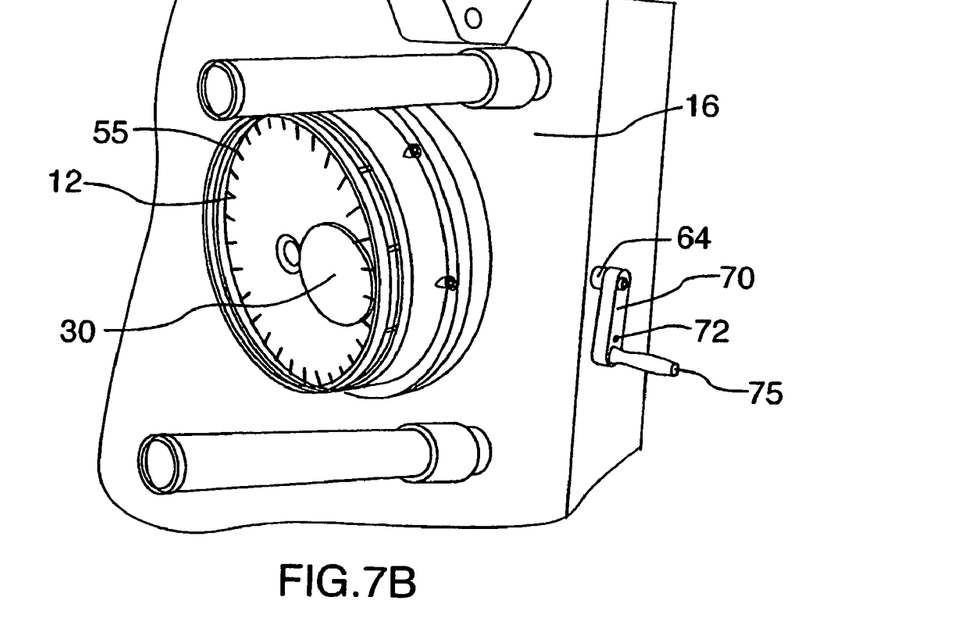
FIG. 7B is a perspective view of the insert inserted into the facial pocket in a prelock position.
Figure 7C:
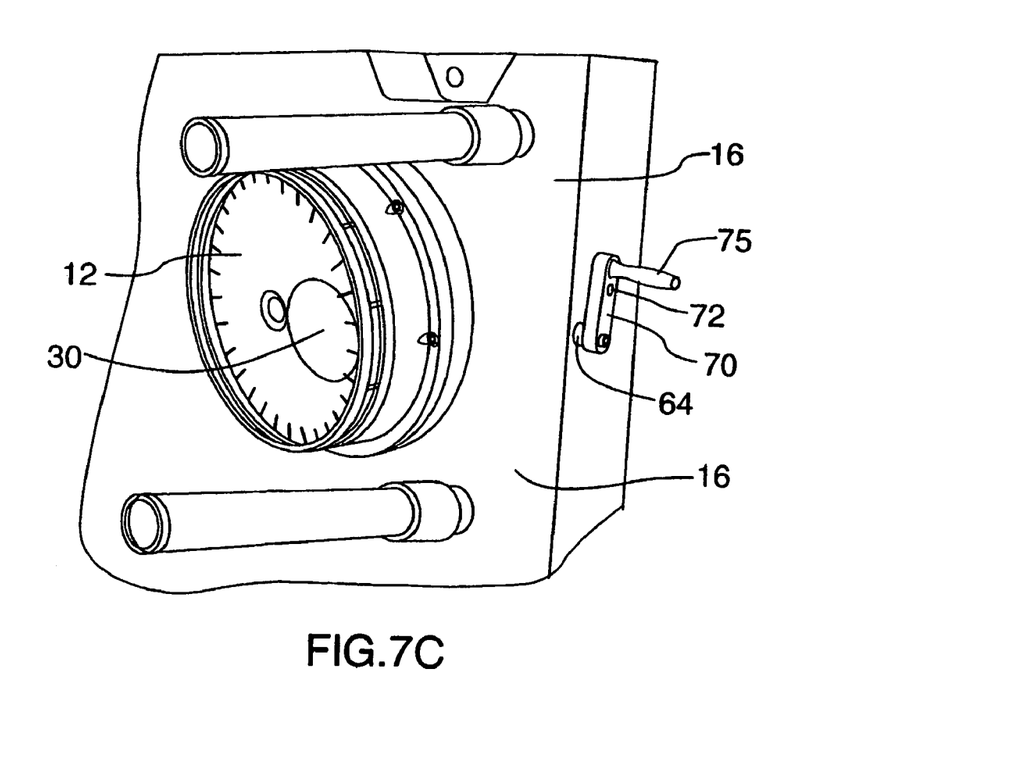
FIG. 7C is perspective view of the insert inserted into the facial pocket in the fully inserted position.

As shown in FIGS. 4 to 6, defined in mold base 16 is a transverse locking passageway 60, extending from a side wall 62 of the mold base, transversely to the length of the insert passageway 46, in communication with passageway 46 thereby allowing access to insert rod 30 when the rod 30 is inserted into passageway 46. Within the transverse passageway 60 is inserted a locking member or rod 64, rotatable about its axis (A-A), which extends therethrough and into the insert passageway 46. The locking member or rod 64 has an offset cam rod 66 extending axially from the end thereof. The offset cam rod 66 may be removable. When the insert rod 36 and insert 30 are in the prelock position, and the locking rod 64 is inserted into the transverse passageway 60, the cam rod 66 engages the insert rod, sitting in transverse slot 38 in the insert rod 36. The locking member or rod 64 may be rotated about its axis A-A by means of a locking handle 70 secured to the outer end of the locking rod 64, adjacent the side wall of the mold base 62. The locking handle is secured to the locking rod by any suitable means and may include a handle grip 75 to assist in operation of the handle. The locking handle 70 extends transversely to the locking rod 64 along the wall of the mold base 62. Rotating the locking handle 70 about the Axis A-A causes the locking rod 64 to rotate such that the offset cam rod 66 positioned within the slot 38, engaging the insert rod 36, moves the insert rod 36 axially (thereby compressing the spring 52 and bumper 50) from the prelock position of FIGS. 4 and 7C to the fully inserted position shown in FIGS. 5 (x side), 6 and 7B. In particular, preferably rotating the locking handle 70 from a first position (as is seen in FIG. 7C) where the insert is positioned in the prelock or offset position, to a second position (as is seen in FIG. 7B), separated from the first position preferably by approximately 180 degrees, rotates the locking rod 64 and the cam rod 66, sufficiently such that rod 66 engages the wall 38A of the slot 38 and moves the insert rod 36 axially to cause the insert to move from the prelock position (of FIGS. 4 and 7C) to the fully inserted position of FIGS. 5, 6 and 7B, where the insert is seated fully within the insert pocket with the insert face flush to the face of the mold plate. Rotating of the locking rod 64 from the second position to the first position causes the insert to be kicked from the fully inserted position of FIGS. 5, 6 and 7B to the prelock position of FIGS. 4 and 7C and thereby allows the insert 30 to be manually removed from the pocket 40. The off set cam rod 66 could be rotated completely out of said insert passageway 46 if desired, for example when changing the insert 30 and insert rod 36. It should be understood that the locking rod may be rotated by any other suitable means, such as a rotatable knob secured to the end of the rod or any other type of handle operable from the periphery of the mold base. It should be further understood that the preferred positioning of the locking handle 70 is shown in FIGS. 7B and 7C only. To aid in the illustration of the parts of the locking handle, its proper positioning is not illustrated in FIGS. 4, 5 and 6.

The locking handle 70 may be releasably secured in place in each of the first and second positions by insertion of a locking pin 72 (or dowel or the like) therethrough which engages the mold base side wall 62 in an appropriate opening 73 therein. Although not shown, alternately, the locking handle may be inserted in place by means of a springball type lock secured to the locking handle 70 which may sit in a recess in the mold base side wall 62 at the first and second positions. Further alternately, a spring biased grip locking handle (not shown) may be secured to the locking handle which would be biased to sit in recesses in the side wall 62 at the appropriate first and second positions. In order to move the locking handle in such an embodiment, the grip locking handle would have to be lifted out of the appropriate recesses.

The heavy tension spring 52 on the insert rod permits the insert rod to be torqued against the back of the blank insert and allows the shaft to move in a direction along its axis with a pre set tension. The shaft moves under tension so that when the cam shaft is rotated into the fully inserted locked position, the blank insert will be pulled into a locked position with some cushioning. Having the spring compression provided by the spring 52 allows for tolerance forgiveness. If the spring and/or the bumper are not utilized, and the components are out of position even minimally, the cam shown in C-C would either be loose which would make the blank insert loose or could put it under severe strain as it is being rotated into the fully inserted locked position.

Although described above is the use of the invention with inserts used with container lids, it should be understood that the invention could be utilized to secure an insert to any form of injection mold face. The mold insert could be secured to the cavity side (such as side Y in FIGS. 4 and 5) of the mold in a like manner to that shown with respect to the core side in the above drawings Typically, the insert rod 36 used on the cavity side would be shorter in length than the insert rod used on the core side and the locking rod 64' would enter the cavity side plate 14 closer to its face as can be seen in FIGS. 4 and 5 (on the y side), illustrating an alternate embodiment of the invention (the rack and pinion embodiment as will be discussed below).

Although the above description and drawings shows opening inserts, the insert system of the invention could be used with engraving inserts.

Figure 8:
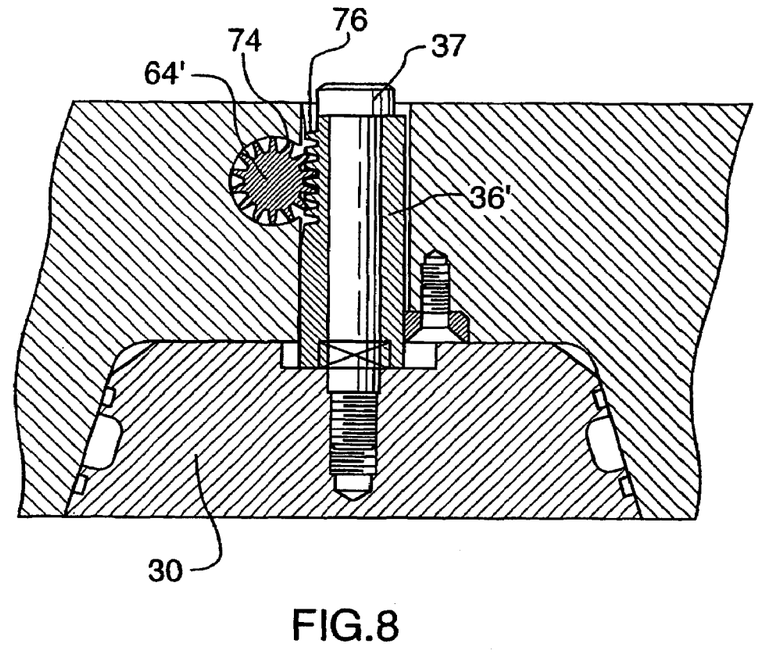
FIG. 8 is a partial sectional view of an alternate embodiment of the invention taken along line G-G of FIG. 4.

Alternate insert systems which act on the insert rod 36 to bring the insert 30 into the facial pocket 40 may be utilized. For example, shown in FIGS. 4 and 5 (on the Y side), the cavity side, and in FIG. 8, a rack and pinion mounting system is illustrated whereby locking handle 70 causes locking rod 64' to rotate about its axis and cause the gear members 74 to engage mating portions 76 of the insert rod 36' to move along its axis between the prelock or offset and fully inserted insert positions. The gear member must be disengaged from the insert rod to allow removal of the insert from the facial pocket. It should be understood that other means of rotation could be utilized such as knob positioned on the peripheral end of the locking rod to rotate the locking rod about its axis.

Figure 9:
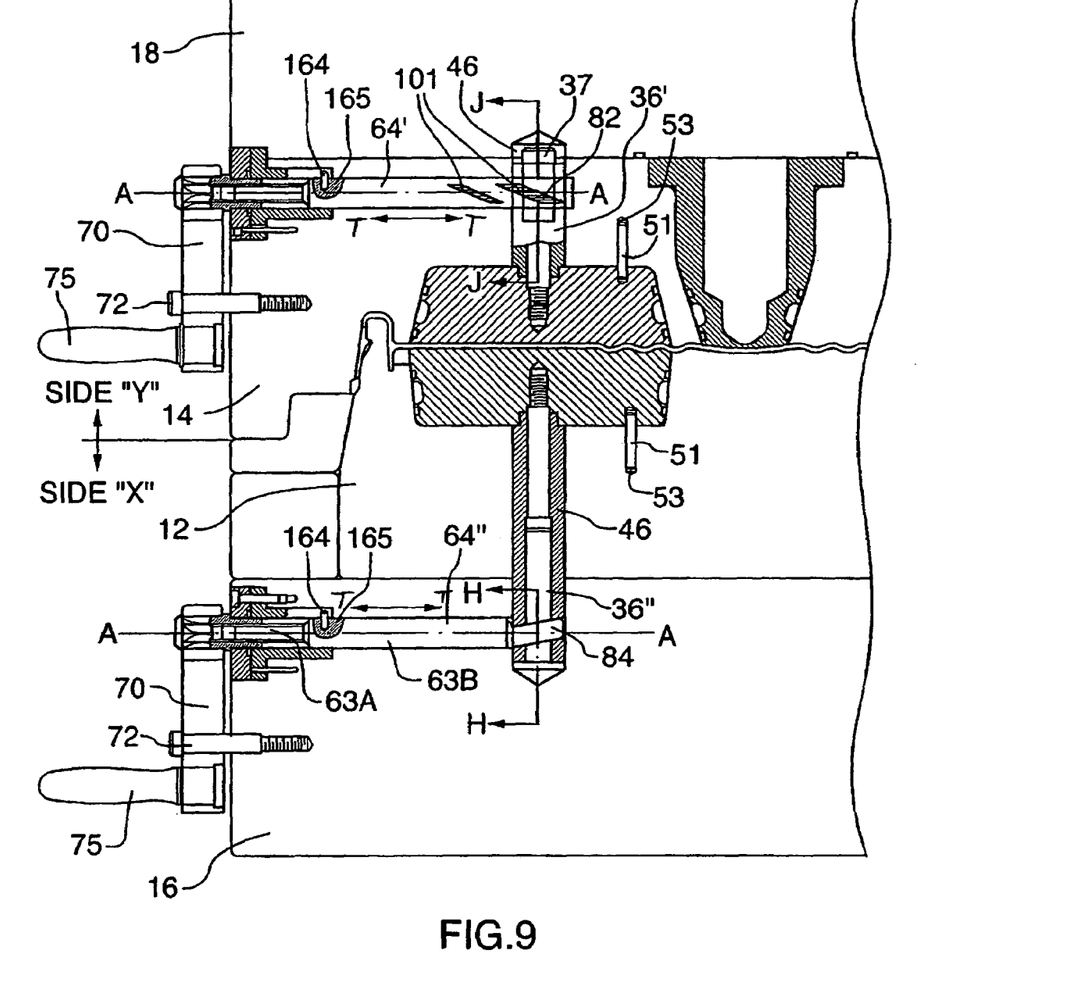
FIG. 9 is a partial section view of further alternate embodiments of the invention.
Figure 9A:
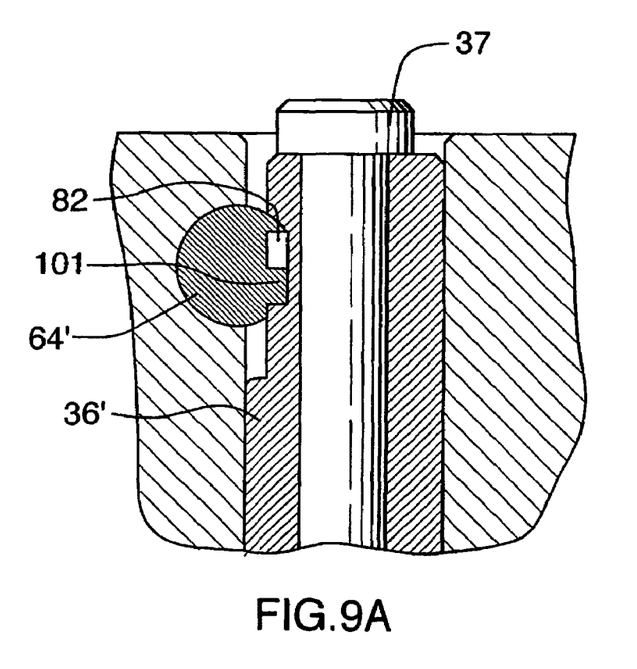
FIG. 9A is a partial section view taken along line J-J of FIG. 9.

Other alternate embodiments are shown in FIGS. 9 and 9A. On the y side of FIG. 9, the locking handle 70 rotates, actuating a transversal movement of the locking rod 64' or 64". The transversal movement of locking rod 64' and 64" are the same as will be discussed below. It should be understood that such transversal movement may be achieved in any known manner. A slanted profile 101 on the locking rod 64' engages mating slots 82 in the insert rod 36 moving it between the prelock and fully inserted positions as it advances and retracts axially. As can be seen on the x side of FIG. 9, locking rod 64" consists of two parts 63A and 63B, threadably engaged together with part 63A being rotatable by the handle 70 to threadably engaging a mating bore in the end of part 63B. Part 63B is prevented from rotation by means of a dowel 164 in notch 165. The dowel may be anchored in mold plate 14 (or alternately in plate 12 or base 16 or 18, depending on which side of the mold this embodiment is utilized with). Part 63A is prevented from moving axially when being rotated into threaded engagement with part 63B and thus 63B is caused to move forward or reverse along the direction T-T as 63A is threadably advanced into 63B. As part 63B advances along the direction of arrow T-T, an angled pin 84 engages insert rod 36" and as part 63B is advances along direction T-T, the angled pin 84 moving forward or reverse along direction T-T causes insert rod and insert to move between prelock and fully inserted positions. Again, it should be understood that the locking rod 64". may be rotated to cause such transversal movement by any suitable rotation means such as a rotatable knob or other suitable means.

Finally, it is to be understood that while certain embodiments of the present invention have been herein shown and described, it will be understood that various changes in size and shape of parts may be made. It will be evident that these modifications, and others which may be obvious to persons of ordinary skill in the art, may be made without departing from the spirit or scope of the invention, which is accordingly limited only by the claims appended hereto, purposively construed.

The invention claimed is:

1. A mold insert system for an injection mold apparatus comprising a mold cavity plate and a mold core plate each secured to mold bases, relatively movable between open and closed positions, each having opposing faces, said faces meeting to define a mold cavity between the two faces, said cavity defining the shape of a molded article, at least one of said faces defining a facial pocket therein for insertion of a mold insert, said facial pocket defining an insert passageway extending from the facial pocket through the plate and base, said mold insert secured to an insert rod, said insert rod including at least one transverse slot extending thereacross, said insert rod insertable into said passageway to a prelock position, whereat said insert is partially inserted into said facial pocket; said mold base defining a transverse passageway extending transversely to and communicating with said insert passageway; a locking member being insertable into said transverse passageway such that a portion of said locking member is positioned within the at least one slot of the insert rod, wherein the locking member is rotatable about its axis when it is inserted in the transverse passageway such that the insert rod may be urged to move between said prelock and fully inserted positions by rotation of said locking member about its axis.

2. A mold insert system according to claim 1, wherein the locking member has a cam rod extending axially therefrom offset from the axis of the locking member, said offset cam rod engaging the slot of the insert rod such that rotation of said locking member about said axis causes the offset cam rod to urge the insert rod and insert between said prelock and fully inserted positions.

3. A mold insert system according to claim 1, wherein said locking member is rotatable about its axis by means of a cam handle positioned on the periphery of said mold base, said handle moving from a first position where said locking member positions said insert in said prelock position to a second position whereat said locking member engages and moves said insert rod and insert to said fully inserted position.

4. A mold insert system according to claim 3, wherein said cam handle may be locked in said first and second positions.

5. A mold insert system according to claim 4, wherein said cam handle is locked by means of dowels insertable through the cam handle into openings adapted for accepting said dowels at the respective first and second positions.

6. A mold insert system according to claim 1, wherein said insert rod is attached to said insert by means of a screw having a head positioned at a lead end of the rod and extending through said rod engaging said insert.

7. A mold insert system for an injection mold apparatus comprising a mold cavity plate and a mold core plate each secured to mold bases, relatively movable between open and closed positions, each having opposing faces, said faces meeting to define a mold cavity between the two faces, said cavity defining the shape of a molded article, at least one of said faces defining a facial pocket therein for insertion of a mold insert, said facial pocket defining an insert passageway extending from the facial pocket through the plate and base, said mold insert secured to an insert rod, said insert rod including at least one transverse slot extending thereacross, said insert rod insertable into said passageway to a prelock position, whereat said insert is partially inserted into said facial pocket; said mold base defining a transverse passageway extending transversely to and communicating with said insert passageway; a locking member being insertable into said transverse passageway such that a portion of said locking member is positioned within the at least one slot of the insert rod, wherein the locking member is rotatable about its axis when it is inserted in the transverse passageway such that the insert rod may be urged to move between said prelock and fully inserted positions by rotation of said locking member about its axis, wherein said insert rod is attached to said insert by means of a screw having a head positioned at a lead end of the rod and extending through said rod engaging said insert and wherein said insert and insert rod are biased in the prelock position by a tension spring positioned at said lead end of the insert rod between the screw head and the rod.

8. A mold insert system according to claim 1, wherein said insert rod is integrally formed to the insert.

9. A mold insert system according to claim 1, wherein said locking rod includes gear members and said at least one insert rod slot forms mating portions of said gear members into which said gear members may be inserted, such that when said gear members engage said mating portions, rotation of said insert rod about its axis causes said insert rod and insert to move between the prelock and fully inserted positions.

10. A mold insert system according to claim 1, whereby said locking rod includes a slanted profile portion which engages said insert rod slot, said insert rod slot being formed such that rotation of the locking rod causes the slanted profile portion to urge to insert rod between the prelock and fully inserted positions.

11. A mold insert according to claim 1, wherein said locking rod includes an angled pin portion which engages said slot in the insert rod, and rotation of said locking rod causes said angled pin portion to advance and retract axially and such advancement and retracting of the angled pin urges said insert rod and insert to move between said prelock and fully inserted positions.

12. A mold insert system according to claim 1, wherein said locking rod is rotated about its axis by means of a knob positioned on a peripheral end of the locking rod.

13. A mold insert system for an injection mold apparatus comprising a mold cavity plate and a mold core plate each secured to mold bases, relatively movable between open and closed positions, each having opposing faces, said faces meeting to define a mold cavity between the two faces, said cavity defining the shape of a molded article, at least one of said faces defining a facial pocket therein for insertion of a mold insert, said facial pocket defining an insert passageway extending from the facial pocket through the plate and base, said mold insert secured to an insert rod, said insert rod including at least one transverse slot extending thereacross, said insert rod insertable into said passageway to a prelock position, whereat said insert is partially inserted into said facial pocket; said mold base defining a transverse passageway extending transversely to and communicating with said insert passageway; a locking member being insertable into said transverse passageway such that a portion of said locking member is positioned within the at least one slot of the insert rod, wherein the locking member is rotatable about its axis when it is inserted in the transverse passageway such that the insert rod may be urged to move between said prelock and fully inserted positions by rotation of said locking member about its axis, wherein said insert and insert rod are biased in the prelock position by means of a spring bumper positioned within the facial pocket.

* * * * *